United States Patent Office 2,943,485
Patented July 5, 1960

2,943,485

AUTOMATIC OVERLOAD PROTECTION FOR FLOW METERS

Thomas J. Byrne, El Dorado, Ark., assignor, by mesne assignments, to The American Oil Company, a corporation of Maryland Filed Feb. 29, 1956, Ser. No. 568,605

4 Claims. (Cl. 73—199)

This invention relates to an accessory for use in connection with flow meters of the type employing a mercury manometer.

Flow meters of the mercury type are extensively used. However, they are subject to the loss of mercury due to surges in flow. To overcome this disability, I provide a pressure relief device across the orifice taps serving a flow meter. The pressure relief device releases the differential pressure created by surges in flow and protects the flow meter against excessive pressure differentials which can displace mercury from the meter.

Figure 1:
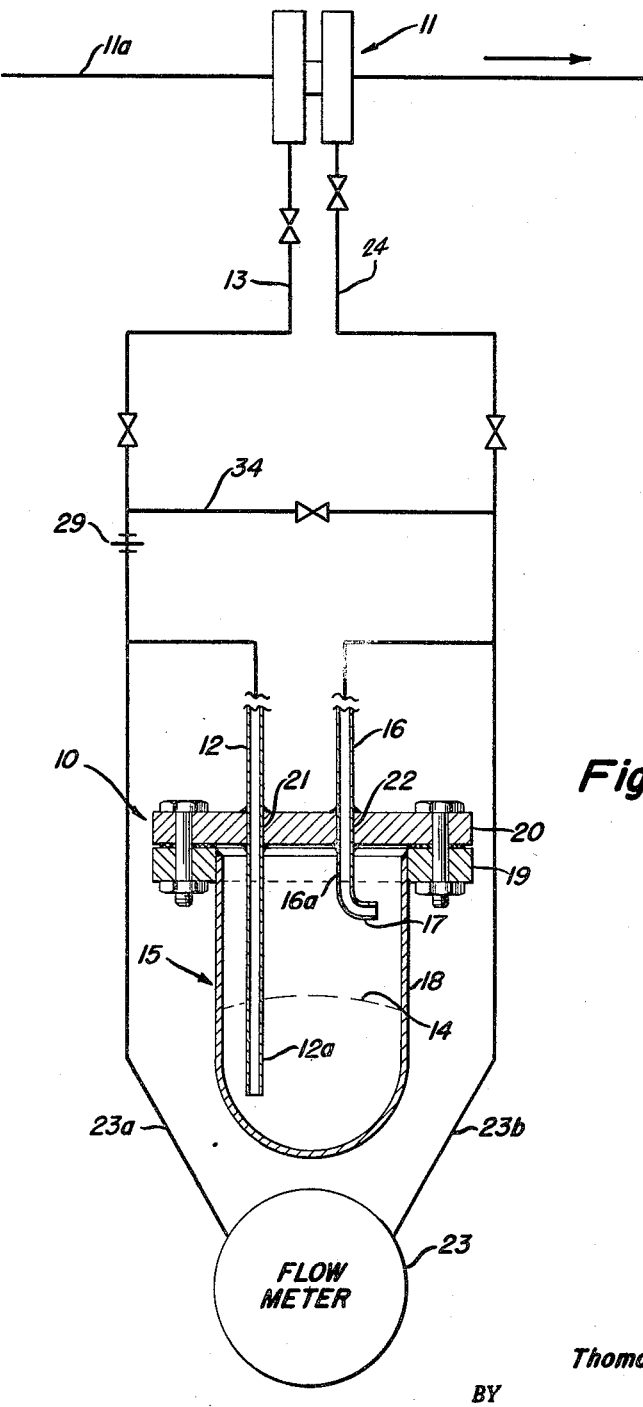
Figure 2:
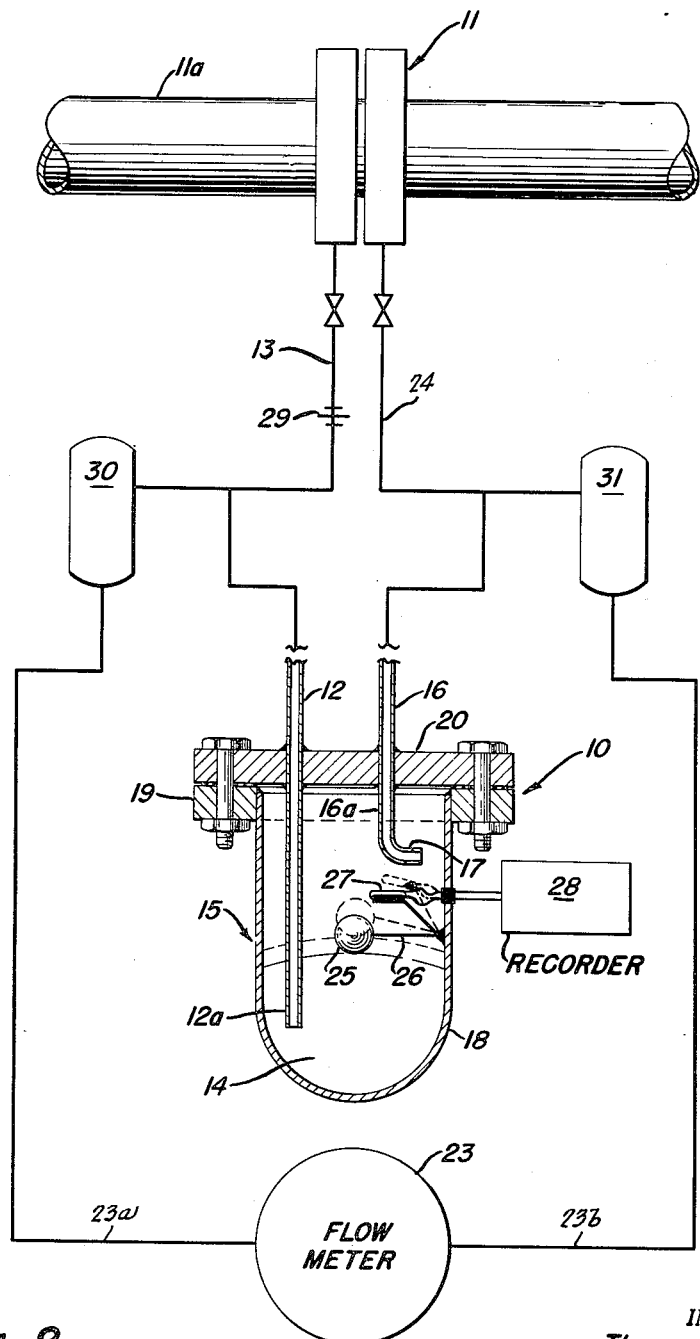

Briefly, the apparatus in its preferred form comprises a secondary mercury pool having a depth which is about 125% of the protected meter range in inches of mercury. Further details and advantages of my apparatus will be described in conjunction with the accompanying drawings wherein:

Figure 1 is a schematic elevation, partly in section, of a typical installation; and Figure 2 is a schematic view, also partly in section, of a system modified to record the periods of relief during which overranging is avoided.

Referring to the drawings, a typical flow meter system includes a conduit 11a through which the fluid to be metered is flowing, an orifice plate assembly 11 with an upstream lead 13 and a downstream lead 24. The flow meter 23 is connected across the upstream and downstream taps 13 and 24 by meter leads 23a and 23b, and the pressure relief device 10, designed according to my invention, is connected across the upstream and downstream leads. According to my device, differential pressure relief is obtained by relieving into the downstream tap 23b of a meter 23 because merely relieving the meter 23 to the atmosphere could result in overranging thereof in the reverse direction.

The relief device 10 comprises a seal effected by immersion of a parallel lead 12 from the upstream orifice tap 13 of the orifice plate 11 in a pool of mercury 14 within the sealed pot 15. The depth of immersion of this lead 12 in the pool 14 of mercury is governed by the amount of mercury used in the relief device 10 rather than the depending length of the lead 12 in the pot 15. Thus, one size of pot 15 may be used to obtain protection for various ranges of flow meter 23 by controlling the depth of the pool 14 of mercury to provide seal depths equal to approximately 125% of the meter range expressed in inches of mercury. A minimum straight height of 6 inches above the pot 15 on the inlet 12a of the upstream lead 12 is used to provide protection against blowing of the mercury from the relief device 10 in the event of a drastic reversal of flow. The downstream lead 16 from the pot 15 is provided with an elbow 17 on its inlet end to minimize the likelihood of blowing out mercury when the device is functioning and vapor or liquid is introduced by lead 12 and passed through the pot 15.

In Figure 1, the relief device 10 comprises a container 18 such as a 4-inch bull plug provided with flange 19. Other sizes of pots 15 may be used depending upon the mercury requirements. The container 18 is closed by blind flange 20 having a first bore 21 to receive the inlet tube 12a from the upstream tap and a second bore 22 through which the outlet tube 16 connected to the downstream tap 24 passes. If the relief device 10 is designed to cover all normal meter ranges of for example from 20 inches to 200 inches of water, greater immersed length of inlet tube 12a will be required than is available from a container 18 alone since for 200-inch range meters immersion depths of from 18 to 19 inches of mercury will be required. Valved line 34 is provided upstream of choke 29 to bypass the relief device 10 and flow meter 23 if desired.

Although I have illustrated the relief device 10 as being a separate unit, it is contemplated that such may be incorporated in the design of the flow meters themselves by casting or forging a pressure relief pot 15 integral with the range tube of such a meter. However, separate and segregated mercury chambers must be maintained or the accuracy of the meter will be adversely affected.

Referring to Figure 2, I have provided a float 25 on the surface of the mercury pool 14 within the relief pot 15. The float 25 is connected by arm 26 to a mercury switch 27 so that displacement of the level of the pool 14 from its normal position will raise the float 25, the arm 26 thereby closing the switch 27 and actuating the overload indicator or recorder 28.

It is essential to the operation of this invention for the protection of flow meters that the capacity of the relief device 10 be adequate to handle the flow of fluids created by the overloading surge. This can be attained by the use of a rather large mercury pot 18 or by providing a choke 29 in the upstream tap line 13. This limits the maximum rate of flow through the meter tap 13 to a low enough rate that it can be handled by a relatively low capacity relief device 10.

Referring more specifically to Figure 2 illustrating meter installations that utilize sealing pots or chambers 30 and 31 at the orifice taps 13 and 24 for protection of the flow meter 23, the relief device 10 is located between the orifice taps 13 and 24 and the sealing pots 30 and 31 to prevent loss of sealing fluid when the relief device 10 operates as a result of overload.

From the above, it will be apparent that I have attained the objects of my invention by providing means for preventing loss of mercury from flow meters and seal pots as a result of surges in flow which produce excessive pressures across the meter taps 13 and 24. However, the embodiments of the invention shown in the drawings and described in some detail, are for the purpose of illustration only. Accordingly, it is contemplated that modifications can be made in the apparatus and in the mode of using the apparatus without departing from the spirit and scope of my invention.

What I claim is:

1. An automatic overload protection means for flow meters adapted to be connected across a pair of meter leads comprising in combination a reservoir chamber, a pool of mercury within said chamber, a first inlet conduit extending from a first of said meter leads into said reservoir chamber with an open end below the level of the pool therein, a choke in the lead to said inlet conduit, a second outlet conduit means communicating with a second of said meter leads and with the said reservoir chamber at a point substantially above the level of the pool therein, said first and second conduit means being of small flow capacity compared to the large storage capacity of said chamber, and an elbow at the lower end of said second outlet conduit having its inlet end disposed toward the wall of said reservoir chamber.

2. A pressure relief device for use in protecting flow meters from overload due to surges in the flow being metered in a transfer line means which comprises in combination a flanged container, a blind flange across the said container and secured to the flange thereon, a pool of heavy liquid within said container, a first conduit of small flow capacity compared to the large storage capacity of said container depending through said blind flange and terminating below the surface of said heavy liquid pool, said first conduit being connected to an upstream tap in such a metering system, and a second conduit means of small flow capacity compared to the large storage capacity of said container depending through said blind flange and having an open end terminating within an upper part of said container above the surface of the liquid pool therein, said second conduit being connected to a downstream tap in such a metering system thereby placing the pressure relief device in parallel with the flow meter in such a system.

3. The apparatus of claim 2 which includes a level-responsive switch means within said reservoir chamber, an indicator-recorder means exterior of said chamber, and electrical circuit means including said indicator-recorder means and controlled by said level-responsive switch means to indicate and record the periods when the pressure across the flow meter is excessive.

4. An apparatus for avoiding overloading of flow meters and for indicating the periods of overload, the apparatus which comprises in combination a flow meter system including first and second leads from an upstream tap and from a downstream tap, respectively, of an orifice plate on a transfer conduit the flow through which is to be measured, a pressure relief device across said leads in parallel flow with said flow meter, said pressure relief device comprising in combination a vertically elongated chamber closed at one end and open at the other, a closure for said open end, a quantity of mercury forming a pool in the lower closed end of said chamber, a first conduit means extending through said closure end depending into said chamber below the surface of said pool, a flow-restricting orifice in the lead from the upstream tap to said first conduit means, a second conduit means depending through said closure and terminating within the upper end thereof above the surface of said pool, float-operated switch means mounted within said chamber and adapted to follow the level of the surface of said pool, and exterior indicator means responsive to said float-operated switch means for indicating when the level of the surface of the mercury pool resulting from pressure differential surges imparted thereto through said first and second conduits activates said float-operated switch means.

References Cited in the file of this patent

UNITED STATES PATENTS

| | | |
|---|---|---|
| 893,521 | Kenton | July 14, 1908 |
| 1,264,115 | Moore | Apr. 23, 1918 |
| 1,618,109 | Sabbah | Feb. 15, 1927 |
| 1,891,155 | Harrison | Dec. 13, 1932 |
| 2,074,950 | Wallace et al. | Mar. 23, 1937 |
| 2,274,697 | Hutchinson et al. | Mar. 3, 1942 |
| 2,374,523 | Beecher | Apr. 24, 1945 |
| 2,505,456 | Beecher | Apr. 25, 1950 |
| 2,703,494 | Carney | Mar. 8, 1955 |

FOREIGN PATENTS

| | | |
|---|---|---|
| 318,550 | Germany | Feb. 10, 1920 |